United States Patent
Liu et al.

(10) Patent No.: US 6,328,368 B1
(45) Date of Patent: Dec. 11, 2001

(54) AUTOMOTIVE WINDSHIELD MOLDING WITH ADHESIVE AND RELEASABLE FILM

(75) Inventors: Ken Tu Liu, North Massapequa, NY (US); Bruce A. Randall, Westerly, RI (US)

(73) Assignee: Dorcas & Kalam Co., Hicksville, NY (US)

( * ) Notice: Subject to any disclaimer, the term of this patent is extended or adjusted under 35 U.S.C. 154(b) by 0 days.

(21) Appl. No.: 09/298,128

(22) Filed: Apr. 23, 1999

(51) Int. Cl.$^7$ ........................................................ B60J 1/02
(52) U.S. Cl. .................... 296/93; 296/95.1; 296/96.14; 296/201
(58) Field of Search ..................... 296/93, 93.1, 96.14, 296/201

(56) References Cited

U.S. PATENT DOCUMENTS

| | | | |
|---|---|---|---|
| 4,165,119 | * 8/1979 | Hedeen et al. | 296/93 |
| 4,712,826 | * 12/1987 | Omori | 296/93 |
| 4,765,673 | * 8/1988 | Frabotta et al. | 296/93 |
| 4,850,640 | 7/1989 | Gold | |
| 4,984,839 | 1/1991 | Miyakawa | |
| 4,986,594 | 1/1991 | Gold | |
| 5,088,787 | 2/1992 | Gross | |
| 5,137,323 | * 8/1992 | Gross et al. | 296/93 |
| 5,263,759 | * 11/1993 | Brodie et al. | 296/93 |
| 5,311,711 | 5/1994 | Desir | |
| 5,338,087 | * 8/1994 | Gross et al. | 296/93 |
| 5,354,614 | * 10/1994 | Cox et al. | 428/343 |
| 5,389,423 | * 2/1995 | Yada | 428/167 |
| 5,421,936 | * 6/1995 | Cox et al. | 156/202 |
| 5,478,132 | 12/1995 | Gold | |
| 5,489,354 | 2/1996 | Gold | |
| 5,509,711 | 4/1996 | Gold | |
| 6,017,038 | * 1/2000 | Wato et al. | 296/93 |
| 6,196,615 | * 3/2001 | Yada | 296/93 |
| 6,224,136 | * 5/2001 | Takagi | 296/96.21 |
| 6,257,644 | * 7/2001 | Young | 296/93 |

OTHER PUBLICATIONS

FlexiTrim Made With Brite–Flex.

* cited by examiner

Primary Examiner—Joseph D. Pape
Assistant Examiner—Kiran B. Patel
(74) Attorney, Agent, or Firm—Niro, Scavone Haller & Niro

(57) ABSTRACT

A molding assembly with an adhesive and a releasable tape or film is disclosed. The adhesive is preferably placed upon the inner face of the tail of the molding so as to contact the auto body as opposed to the windshield frame, thus avoiding seepage into the pinch well. The invention further preferably comprises a pressure sensitive adhesive that bonds the molding to vehicle body without the need for curing or other processing. A second preferred embodiment of the present invention comprises a pressure sensitive adhesive and releasable tape disposed on the inner face of the molding body for facilitating the immediate in situ bonding between the molding and the windshield.

14 Claims, 1 Drawing Sheet

AUTOMOTIVE WINDSHIELD MOLDING WITH ADHESIVE AND RELEASABLE FILM

BACKGROUND OF THE INVENTION

This invention relates generally to a molding for use with a windshield in automobiles and other devices. Specifically, the present invention entails the use of an adhesive (preferably pressure sensitive) on the back or tail portion of the molding wherein the adhesive is covered by a piece of removable tape or film until use, the adhesive then being capable of securing the molding to the vehicle body to so as to avoid seepage into the pinch well and preserve the smooth aerodynamics/appearance of the molding to the vehicle body.

SUMMARY OF THE INVENTION

The present invention employs a removable film or tape from an automotive windshield molding to expose an adhesive for adhering to an automotive windshield frame, or more preferably, to the vehicle body itself. The adhesive and releasable film are preferably located on the tail portion of the molding, thereby better facilitating the in situ removal of the removal of the backing. This placement of the adhesive on the tail creates a liquid impervious seal between the molding and the vehicle body, thus avoiding seepage into the pinch well (i.e., the recess point from the vehicle body to the window frame) and the subsequent degradation of the molding and vehicle metalwork.

A variety of automotive windows are installed in situ with peripheral framing which allows the installer to place the windshield in operation. One method of installing windshields in situ is shown in U.S. Pat. No. 5,478,132 (Gold) which discloses an automotive window molding comprising a curable adhesive that secures the molding, and in turn, the windshield to the window frame. Other means of securing moldings to automotive window frames can be seen in U.S. Pat. No. 5,311,711 (Desir Sr.) which discloses a complex composite clamping portion of a molding which eliminates roll over or disengagement of the molding from the glass prior to complete assembly.

The prior art, however, does not teach or suggest the use of an adhesive that does not require curing or further processing. As a result, it is believed that presently available window installation techniques require the use of masking tape or similar protection to keep windshields in their frames until the molding has firmly adhered to the windshield and/or pinch well. Furthermore, the prior art teaches the use of a curable adhesive bonding to the automotive window frame instead of the vehicle body. Thus, the pinch-well (i.e. the recession where the vehicle body meets the frame) becomes a natural collection point for water and other foreign matter. The corrosive effects of such material on moldings and similar materials is well known, and should be avoided.

What is needed is a simple, inexpensive molding configuration with adhesive that provides for the immediate in situ bonding of the molding to both the windshield and the window frame or vehicle body. What is further needed is a molding and adhesive arrangement that does not require any additional curing or process steps prior to assembly, nor retention after assembly until full cure is achieved. Specifically, what is needed is a molding and adhesive assembly that eliminates the need for masking tape or other protection to facilitate the final placement of a windshield in a vehicle frame. Also, what is needed is a simple molding and an adhesive configuration that minimizes the possibility of seepage into the pinch-well of the automotive window frame and retain smooth transition between molding and body.

In accord with these needs, the present invention discloses a J-shaped molding having two arm portions, a body portion, and a tail portion. The tail is adapted to contact and conform to the vehicle body. Specifically, the face or side of the tail that contacts the vehicle body is covered with a contact adhesive. The contacted adhesive may be of any type known to those of skill in the art, but preferably should not require any further processing steps to adhere securely to the vehicle body. Furthermore, the adhesive on the tail is initially covered with a releasable plastic film or tape which is removed after the molding and windshield are in place. Thus, the removal of the plastic tape or covering provides for the immediate bonding in situ of the molding to the automotive window frame. Optionally, the interior of the body of the molding may likewise be fitted with a similar adhesive and releasable tape assembly so as to provide an immediate anchoring of the windshield within the molding.

A further understanding of the present invention will be appreciated from the following description of the preferred embodiments taken in conjunction with the drawings and claims, which are described as follows:

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENT

Figure 1:
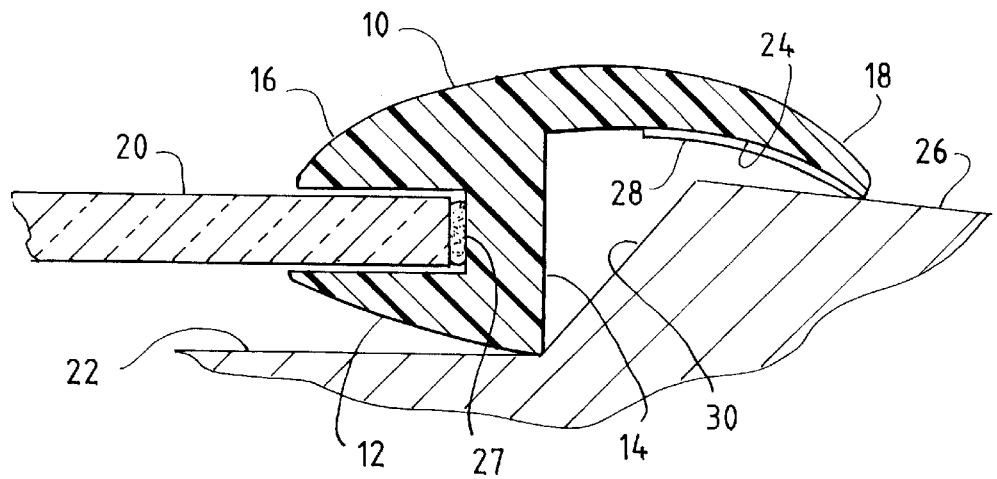
FIG. 1 is an exposed side view showing the molding and adhesive assembly of the present invention in contact with the vehicle body.
Figure 2:
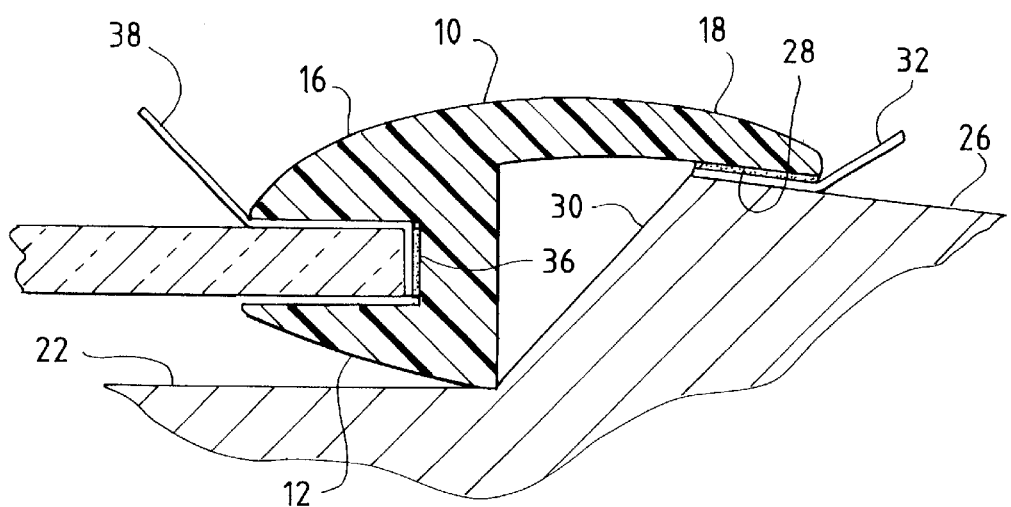
FIG. 2 is an exposed side view of the present invention showing the releasable plastic films or tapes engaged on the interiors of the body portion and the tail portion of the molding.

Referring to FIGS. 1 and 2, preferred embodiments of a molding adhering to an automotive windshield are illustrated. FIG. 1 illustrates generally a first preferred embodiment of the present invention comprising a J-shaped molding 10 comprising an inner leg 12, body 14, outer leg 16 and tail 18. The inner and outer legs are adapted to create a frictional grip on windshield 20, although ordinary glue may also be used to adhere the windshield 20 to the body 14 and/or the legs. The inner leg is positioned so as to rest in situ against the window frame 22, while the inner face 24 of tail 18 contacts vehicle body 26. It will, of course, be appreciated by those of skill in the art that molding 10 is adapted for use specifically in the automotive industry, but also has advantages useful for other fields.

Molding 10 is generally comprised of a suitable extruded plastic, or rubber, or other suitable pliable material and preferably extends around the periphery of the windshield 20. The body 14 typically extends a distance between outer leg 16 and inner leg 12 that is equal to or slightly greater than the width of windshield 20. In this first preferred embodiment, the interior face 27 of the body 14 is covered with glue for adhering to the windshield. The present invention further comprises an adhesive 28 on the inner face 24 of tail 18. The adhesive 28 is covered by plastic film or tape 32 which prevents adhesion of the molding to any surface prior to installation. The tape 32 is plastic and most preferably has high strength and a low modulus of elasticity so as to prevent unnecessary stretching or breaking of the tape during removal. The tape 32 also extends to beyond the end of the tail such that it is accessible to the installer when the molding is placed within the window frame 22. Thus, when tape 32 is removed by an installer after the windshield is mounted, adhesive 28 creates a fluid tight seal between the tail 18 and the vehicle body 26, thus preventing seepage into the pinch well 30.

While polyacrylic derived adhesives and other similar pressure sensitive adhesives are preferably used as the adhesive 28 of the present invention, other adhesives may be suitable. However, it is greatly preferred that the adhesive used has a greater coefficient of adhesion with respect to the molding 10 than the releasable tape 32. Thus, when the tape 32 is removed, enough adhesive remains on the molding 10 to secure the attachment to the vehicle body. Further, it is preferred that the coefficient of adhesion is greater with respect to the vehicle body than with respect to the molding. In other words, the adhesive 28 should not stick to the molding such that it removes paint from the automobile when the molding is removed in preparation of windshield replacement. Most preferably, the adhesive of the windshield molding is alcohol or tiling soluble so that it could be removed from the auto body in preparation of windshield replacement. Those of ordinary skill will understand and appreciate the general features that are desired and shown by a pressure sensitive adhesive, and will derive and optimize such features with reference to treatises in the art of adhesives, such as *Coating Technology Handbook*, pp. 637–48 (1991, D. Satas, ed.).

Referring to FIG. 2, the inner face 27 of body 14 can be similarly fitted with a windshield adhesive 36 and a releasable film or tape 38. As with the adhesive 28 for attaching the molding to the auto body 26, the windshield adhesive 36 is designed to provide the immediate adhesion of the windshield 20 to the molding 10. In this second preferred embodiment, the releasable film 38 can project or extend beyond the "cup" formed by the inner and/or outer legs such that an installer can grip and remove the film before the molding is attached to windshield or after the windshield has been installed.

Of course, it should be understood that various changes and modifications to the preferred embodiments described herein will be apparent to those skilled in the art. For instance, other forms of releasable tapes or films may be used other than plastics. Likewise, the adhesive may also be used in combination with the releasable film to secure the molding to the window frame instead of the vehicle body. Nor do the advantages and uses of the present invention need to be limited to "J-shape" moldings—other configuration moldings will have the ability to accept the adhesive and releasable film so as to secure the molding (either through the body or the inner leg) to the window frame, as opposed to the vehicle body. Such changes and modifications to the use and design of the present invention can be made without departing from its the spirit and scope and without diminishing its attendant advantages. It is, therefore, intended that all such changes and modifications be covered by the following claims.

What is claimed is:

1. A vehicle window molding assembly for mounting a windshield in a window frame recessed within a vehicle body, said assembly comprising a molding including a body, an inner leg, an outer leg, and a tail connected to said body, said inner leg placed between said windshield and said window frame, said inner and outer legs cooperating to frictionally engaged the inner and outer surfaces, respectively, of said windshield, said tail extending away from said windshield and contacting said vehicle body, wherein at least a portion of said tail in contact with said vehicle body is coated with an adhesive for creating a substantially fluid tight seal between said molding and said vehicle body, and said assembly further comprising a releasable film covering said adhesive, wherein at least a portion of said releasable film is visible to an installer when said molding is mounted.

2. The assembly of claim 1, wherein the adhesive is a pressure sensitive adhesive.

3. The assembly of claim 2, wherein the adhesive comprises a polyacrylic.

4. The assembly of claim 1, further comprising an adhesive coating said body portion of said molding, said adhesive being operatively connected to said windshield.

5. The assembly of claim 4, further comprising a releasable film covering said adhesive on said body portion of said molding, said releasable film extending from said molding when said windshield is mounted such that the releasable film may be selectively removed, whereby said assembly facilitates the in situ adhesion of said molding to said windshield.

6. The assembly of claim 4, wherein said adhesive coating said body portion is a pressure sensitive adhesive.

7. The assembly of claim 6, wherein the adhesive coating said tail portion is a pressure sensitive adhesive.

8. The assembly of claim 7, wherein the adhesive comprises a polyacrylic.

9. A vehicle window molding assembly for mounting a windshield in a window frame recessed within a vehicle body, said assembly comprising a molding disposed to contact with said vehicle body, an adhesive covering at least a portion of said molding disposed to contact said vehicle body, and a releasable film covering said adhesive, said releasable film extending from said molding when said windshield is mounted such that the releasable film may be selectively removed, whereby said assembly facilitates the in situ adhesion of said molding to said vehicle body.

10. The assembly of claim 9, wherein the adhesive is a pressure sensitive adhesive.

11. The assembly of claim 10, wherein the adhesive comprises a polyacrylic.

12. A vehicle window molding assembly for mounting a windshield in a window frame recessed within a vehicle body, said assembly comprising a molding disposed to contact with said vehicle body, an adhesive covering at least a portion of said molding disposed to contact said window frame, and a releasable film covering said adhesive, said releasable film extending from said molding when said windshield is mounted such that the releasable film may be selectively removed, whereby said assembly facilitates the in situ adhesion of said molding to said window frame.

13. The assembly of claim 12, wherein the adhesive is a pressure sensitive adhesive.

14. The assembly of claim 13, wherein the adhesive comprises a polyacrylic.

* * * * *